UNITED STATES PATENT OFFICE 2,563,034

RHODANINE β-SUBSTITUTED PROPIONIC ACID

Thomas L. Gresham and Forrest W. Shaver, Akron, Ohio, assignors to The B. F. Goodrich Company, New York, N. Y., a corporation of New York No Drawing. Application July 5, 1949, Serial No. 103,168

1 Claim. (Cl. 260—306.7)

This invention relates to the preparation of beta-substituted carboxylic acids, particularly propionic acids, and is especially concerned with the preparation of such compounds by the reaction of beta-lactones with certain nitrogen, sulfur and oxygen-containing heterocyclic compounds such as rhodanine.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

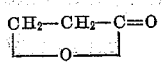

is economically obtained from ketene and formaldehyde.

We have now discovered that beta-propiolactone, and also the other saturated aliphatic beta-lactones, will react with nitrogen, sulfur and oxygen-containing heterocyclic compounds containing the structure

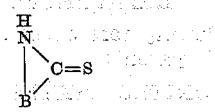

wherein B represents a radical containing from three to four cyclic atoms from two to three of which are carbon and one of which is nitrogen or sulfur, and having from one to three oxo atoms (O=) attached to cyclic carbon atoms, to produce beta-substituted carboxylic acids. The equation for this reaction is believed to be represented as follows:

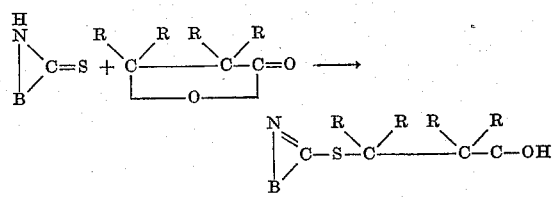

wherein each R represents hydrogen or an alkyl radical and B has the same meaning as defined above, although the product may be one in which the beta carbon atom is attached to nitrogen, that is, it may possess the structure

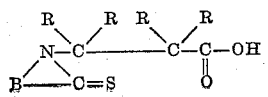

Examples of nitrogen, sulfur and oxygen-containing heterocyclic compounds of the class described are the following:

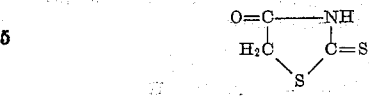

Rhodanine

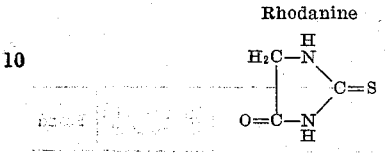

Thiohydantoin

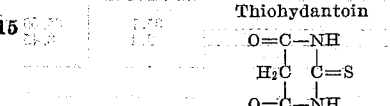

Thiobarbituric acid

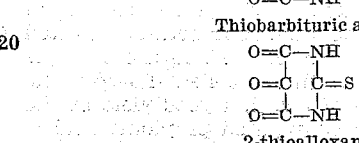

2-thioalloxan

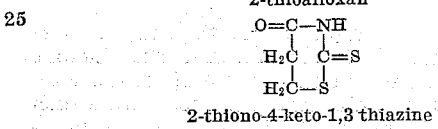

2-thiono-4-keto-1,3 thiazine

No special conditions for the reaction are necessary, the reaction proceeding whenever it is possible to bring the reactants into effective contact with one another. This is ordinarily accomplished by the use of a solvent for the reactants, polar solvents being preferred. Since many of the nitrogen, oxygen and sulfur-containing heterocyclic compounds are soluble in water or in aqueous alkaline solutions the use of water or an alkali solution as the medium for the reactants is an especially preferred procedure. In this event the beta-substituted acid, being generally insoluble in water, is precipitated during the reaction or on acidification of the reaction medium and is thus readily separated from the reaction medium. Other polar solvents which dissolve the reactants such as alcohols, organic acids, organic nitriles, and the like, however, may also be used. The temperature at which the reaction is effected is not critical but is preferably from 0 to 100° C., more preferably from 0 to 50° C. Proportions of reactants may be varied widely using an excess of either of the reactants if desired, but in general the use of substantially equimolecular proportions of the reactants is preferred.

Rhodanine is a preferred nitrogen, sulfur and oxygen-containing heterocyclic compound of the type hereinabove set forth and beta-propiolactone is the preferred beta-lactone. Accordingly, the invention will be specifically illustrated by the following example of the reaction of these materials to produce a beta-substituted propionic acid.

*Example*

26.6 parts (0.2 mole) of rhodanine and 8.5 parts of sodium hydroxide are added to 125 parts of water. 14.4 parts (0.2 mole) of beta-propiolactone are slowly added to this mixture with constant stirring, the temperature of the reaction mixture being maintained at from 20° to 30° C. After the lactone addition is complete, 0.2 mole of concentrated hydrochloric acid is added to the reaction mixture, whereupon a red oil layer is formed which crystallizes upon standing. The crystalline product is then removed by filtering and recrystallized first from a water-ethanol mixture and secondly from chloroform. A 60% yield of a compound melting at 132°–133° C. and possessing the probable structure

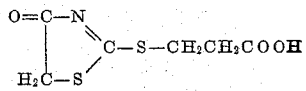

is obtained.

| Analysis | Calculated for $C_6H_7O_3S_2N$ | Found |
|---|---|---|
| C | 35.1 | 35.09 |
| H | 3.4 | 3.45 |

When the above example is repeated using thiohydantoin, thiobarbituric acid and thioallantoin in place of rhodanine other solid beta-substituted propionic acids are secured. When the example is repeated using 2-thiono-4-keto-1,3-thiazane and in the absence of alkali, a good yield of the corresponding beta-substituted propionic acid is secured.

Although beta-propiolactone, the simplest possible beta-lactone, is the preferred beta-lactone for use in this invention because of its low cost, its solubility in water and the ease with which the reaction is carried out, the homologs of beta-propiolactone, that is, other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-isopropyl-beta-propiolactone, alpha-butyl-beta-propiolactone, alpha-methyl-beta-butyrolactone, alpha-ethyl-beta-butyrolactone, beta-methyl-beta-valerolactone and the like may also be used to produce other beta-substituted carboxylic acid compounds. All these beta-lactones are of the general structure

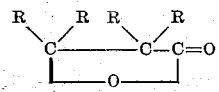

wherein R is hydrogen or a lower alkyl group so that the lactone contains a total of 3 to 8 carbon atoms.

The beta-substituted carboxylic acids obtained by the reaction described are generally solid organic compounds which are useful as intermediates in the preparation of other compounds and for various other purposes. In many instances they may be cyclized to produce heterocyclic nitrogen and sulfur containing compounds. They are also useful in the preparation of insecticidal, fungicidal and physiologically active compositions.

Numerous other modifications and variations in the method of effecting the reaction and in the materials therein used will be obvious to those skilled in the art and are within the spirit and scope of the invention as defined in the appended claims.

This application is a continuation-in-part of the copending application Serial No. 620,661, filed October 5, 1945, now U. S. Patent 2,474,838.

We claim:

The compound of the formula

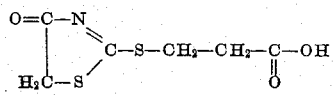

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,099,374 | Schwarz | Nov. 16, 1937 |
| 2,407,138 | Clifford | Sept. 3, 1946 |
| 2,483,416 | Jansen et al. | Oct. 4, 1949 |

Certificate of Correction

August 7, 1951

Patent No. 2,563,034

THOMAS L. GRESHAM ET AL.

It is hereby certified that error appears in the printed specification of the above numbered patent requiring correction as follows:

Column 1, lines 43 to 46, inclusive, for that portion of the formula reading $$\begin{array}{c}R\phantom{xx}R\\ \diagdown\!\!\diagup\\ \text{—C—C—OH}\end{array}\quad \text{read} \quad $$

column 3, line 33, in the table, second column thereof, for "$C_6H_7C_3S_2N$" read $C_6H_7O_3S_2N$; same table, column 3 thereof, same line, for "Foand" read *Found*; and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*